United States Patent [19]

Holcomb et al.

[11] Patent Number: 4,697,749

[45] Date of Patent: * Oct. 6, 1987

[54] COMBINATION CONDIMENT GRINDER AND DISPENSER

[75] Inventors: David A. Holcomb; James A. Tryon, both of Seattle, Wash.

[73] Assignee: F. Bartow Fite, Seattle, Wash.

[*] Notice: The portion of the term of this patent subsequent to Mar. 4, 2003 has been disclaimed.

[21] Appl. No.: 792,455

[22] Filed: Oct. 29, 1985

Related U.S. Application Data

[62] Division of Ser. No. 738,827, May 29, 1985, Pat. No. 4,573,244.

[51] Int. Cl.⁴ ............................................. A47J 42/34
[52] U.S. Cl. .................................... 241/169; 241/262; 241/286
[58] Field of Search ............... 241/270, 271, 283, 263, 241/262, 169, 168, 286, 169.1, 101.3, 239, 240, 241, DIG. 27, 602, 205, DIG. 17, 257 R, 259.1, 259.2, 259.3, 260, 261.2, 273.2; 222/142.1, 510

[56] References Cited

U.S. PATENT DOCUMENTS

| | | | |
|---|---|---|---|
| 790,619 | 5/1905 | Clough | 241/263 X |
| 1,412,883 | 4/1922 | Maddux | 241/602 X |
| 1,930,056 | 10/1933 | Klingler . | |
| 2,045,058 | 6/1936 | Stern . | |
| 2,047,566 | 7/1936 | Klingler . | |
| 2,480,271 | 8/1949 | Sumner | 241/602 X |
| 2,679,360 | 5/1954 | Arni . | |
| 2,683,566 | 7/1954 | Bentley . | |
| 2,698,719 | 1/1955 | Heard . | |
| 2,876,956 | 3/1959 | Bentley . | |
| 3,055,599 | 9/1962 | Cowles et al. . | |
| 3,096,036 | 7/1963 | Cowles et al. . | |
| 3,464,469 | 9/1969 | Belz | 241/602 X |
| 3,827,641 | 8/1974 | Andersson . | |
| 4,374,574 | 2/1983 | David . | |
| 4,573,244 | 3/1986 | Holcomb et al. | 241/169 |

FOREIGN PATENT DOCUMENTS

| | | |
|---|---|---|
| 23322 | 3/1906 | Fed. Rep. of Germany . |
| 911245 | 7/1946 | France . |

Primary Examiner—Mark Rosenbaum
Attorney, Agent, or Firm—Seed and Berry

[57] ABSTRACT

A combination condiment grinder and dispenser mechanism (10) which can be held and operated by one hand and which includes a hand-activated lever (80) which when squeezed forces a grinding surface (88,90) in one direction against spring (92) pressure. When the hand-actuated lever (80) is released, the grinding surface (90) reverses. The grinding action thus is linear or arcuate. The upper portion of the dispenser has a salt or other condiment compartment (38) which can be sprinkled from the top thereof. Only one hand is necessary to dispense either pepper or salt or other condiment from the body of the device.

18 Claims, 17 Drawing Figures

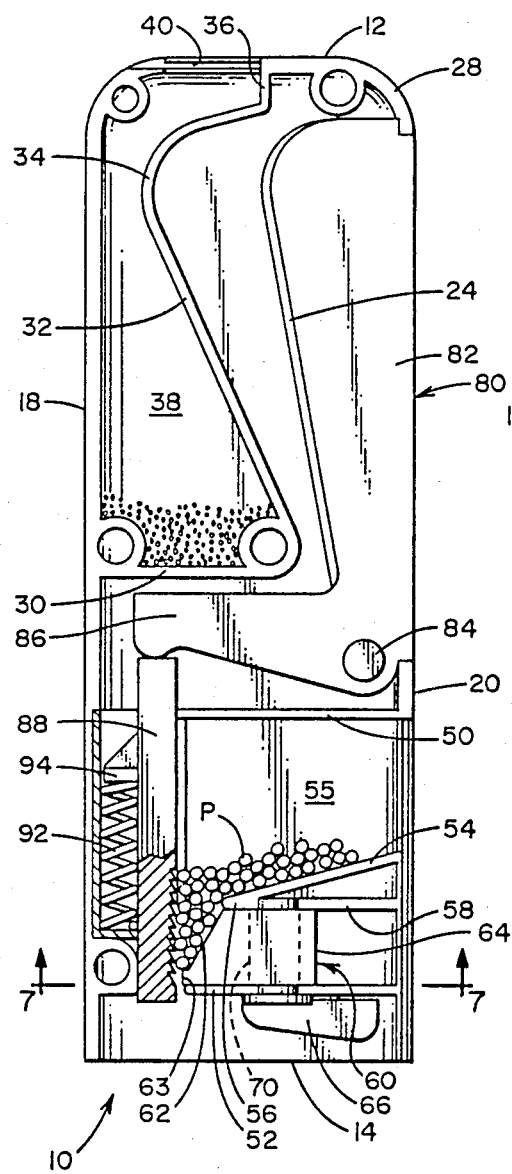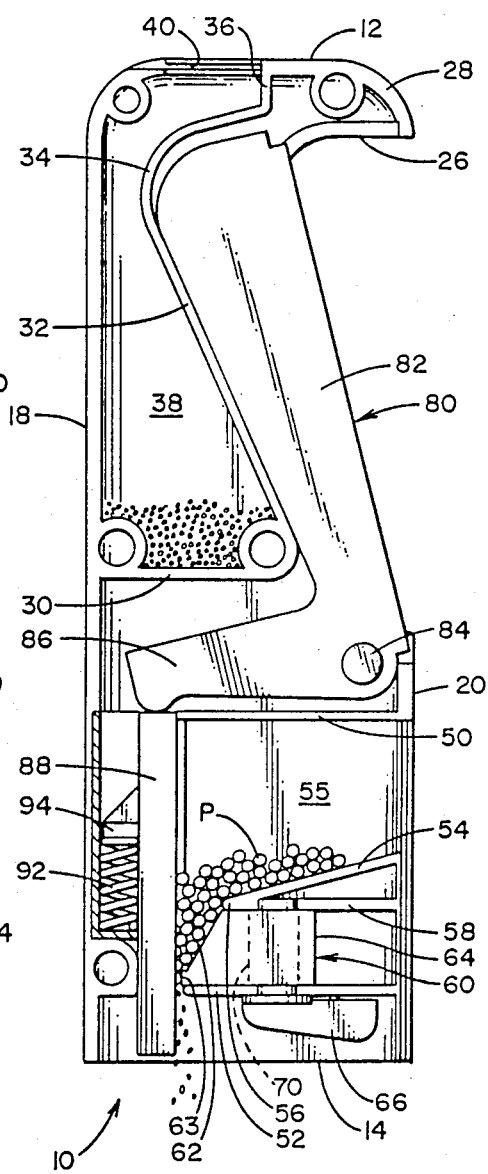

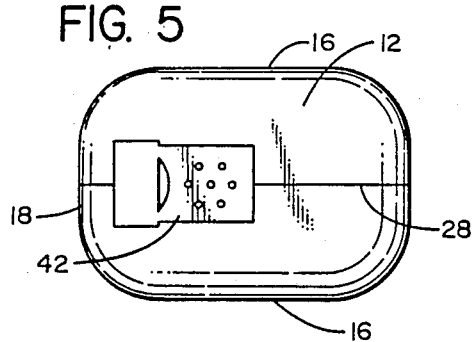
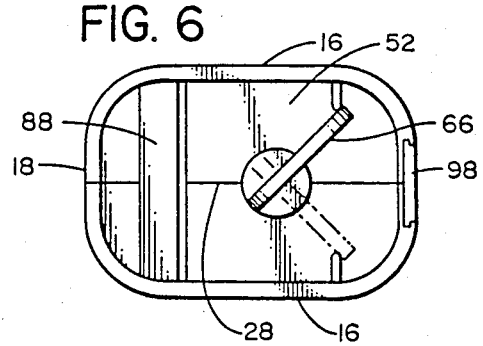
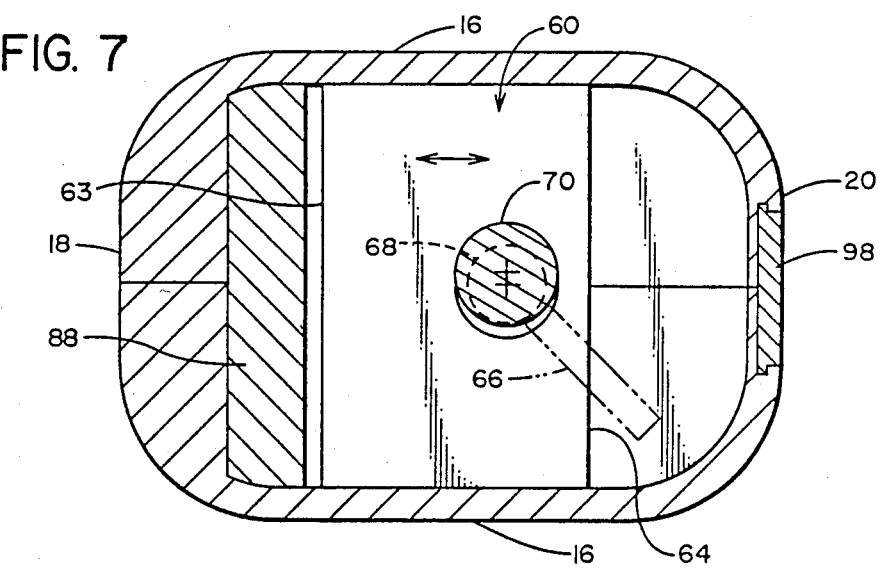
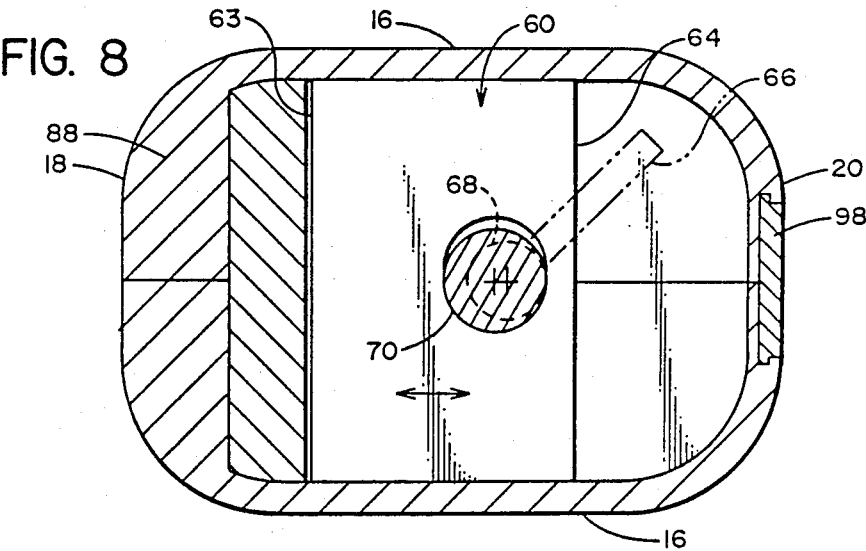

4,697,749

COMBINATION CONDIMENT GRINDER AND DISPENSER

This application is a division of U.S. patent application Ser. No. 738,827, filed May 29, 1985 now U.S. Pat. No. 4,573,244.

TECHNICAL FIELD

The invention relates to a combination condiment grinder and dispenser apparatus and is more particularly concerned with a hand-held and hand operated grinder mechanism for peppercorns or the like and for holding another seasing such as salt.

BACKGROUND ART

As is well known, the use of table grinders or so called peppermills intended for different types of condiments when preparing food has become increasingly popular owing to an increased interest in seasoned dishes and in spices. A common feature of most known types of table grinders is that they are intended for grinding one single variety of spice or a single mixture of spices. Hand-held and hand-operated spice or condiment grindes or peppermills generally have an elongated cylindrical housing which is asthetically configured as an attractive item of tableware. The so called spice grinders or peppermills enclose a condiment storage chamber and the grinding mechanism dispenses the ground condiments through an opening provided in the bottom. The most widely used type of spice or pepper grinders have a crank arm directly connected to the shaft of the grinding mechanism which is turned continuously and unidirectionally with one hand of the user while the other hand holds the peppermill over the food generally vertically with the ground condiment or spice dropping, out of the bototm.

Obvisouly, it is a distinct drawback of the crank-type grinders which are structured as indicated above that both hands are needed for operating the same. This can be inconvenient if the user wants to stir food while mixing condiment, otherwise has one hand occupied or if the user is handicapped.

There are some types of single hand operated peppermill devices which instead of being crank-types are operated by a thumb for depressing an actuating member which in turn activates a broaching function of the grinding elements within the body of the device.

U.S. Pat. Nos. 3,055,599 and 4,096,036 are both examples of the spring loaded and thumb depressed central spindle mechanism with a serrated surface for grinding peppercorns together with the cooperating tapered surface. As a result, the pulverized or ground pieces of peppercorn are dropped on through the exit aperture at the lower end of the peppermill housing.

U.S. Pat. No. 2,698,719 is a depression-type mechanism also using a cutter-type central spindle device in conjunction with cooperating tapered or conical surfaces to shape or pulverize the condiment.

U.S. Pat. No. 2,683,566 again is a variation of the thumb depressed device for grinding condiment.

U.S. Pat. No. 2,876,956 shows a structural variation but which is somewhat similar in principle also to U.S. Pat. No. 2,679,360 for activating the cooperating cutting surfaces by a centrally located spring loaded depression member.

U.S. Pat. No. 3,827,641 shows a rotary-type multipurpose grinding mill.

Finally, U.S. Pat. No. 4,374,574 shows a single hand-operated mechanismwhich involves a clutching mechanism for rotating one cutting or grinder surface relative to a stationary surface.

None of the above devices are similar to the instant device in terms of structure or operating principle and for that reason, are of only interest and do not anticipate the claimed subject matter herein.

DISCLOSURE OF INVENTION

The invention comprises a generally upstanding, asthetically configured body or housing which includes a hand and lever recess portion. The L-shaped lever has an upstanding or generally vertical portion in the recess and an inwardly extending actuator arm. When the user of the condiment device squeezes the housing, the lever is depressed or actuated and the inwardly extending arm forces an element having a grinding surface downwardly against spring pressure. The grinding surface, which functions linearly, cooperates with an angled surface to trap the peppercorns or condiment material to crack it and then force it down for final pulverization so that the ground materials can fall out through a gap at the lower end of the housing.

An anti-dribble feature is included so that upon cessation of grinding no ground particles will continue to fall from the device. An upper chamber in the device is also provided with another condiment such as salt. An adjustment mechanism is provided in the lower end of the housing for adjusting the coarseness of the grind for the peppercorns or other condiment as desired.

Accordingly, it is among the many features of the invention that it is designed to be used and operated with one hand. The device has an adjustability feature to regulate the coarseness of the grind according to the preferences or needs of users. The device also contains a chamber for salt or other desired condiment so that two condiments used in food preparation are in the device and can be dispensed by onely one hand. The device is easily and conveniently loaded both with peppercorns and with a supply of condiment for the upper surface. The mechanism for grinding is essentially quite simple and designed for long life and reliability as a commercial and home kitchen and tableware item.

BRIEF DESCRIPTION OF THE DRAWINGS

FIG. 3 is a side elevational view of onehalf of the body showing additional details of construction;

FIG. 4 is the same view as side elevational view of FIG. 3 but with the operating lever pivoted so as to further illustrate the grinding action;

FIG. 5 is a top plan view of the housing or body showing the perforated opening for the condiment in the top compartment;

FIG. 6 is a bottom plan view of the housing showing the adjustment mechanism for regulating the coarseness of the condiment grinder;

FIG. 7 shows an enlarged cross-sectional view along the line 7—7 of FIG. 3 showing details of a large adjustment or for coarse grind; and FIG. 8 is a similar view as FIG. 7 showing the adjustment feature to a finer grind than in FIG. 7.

BEST MODE FOR CARRYING OUT THE INVENTION

Figure 1:
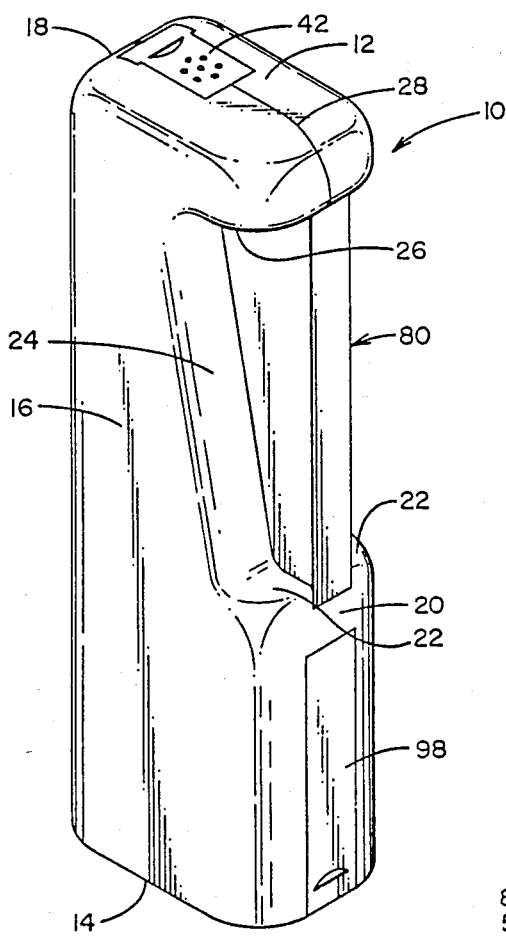
FIG. 1 is a perspective view of the condiment dispenser grinder housing showing generally its asthetic appearance from the outside.
Figure 2:
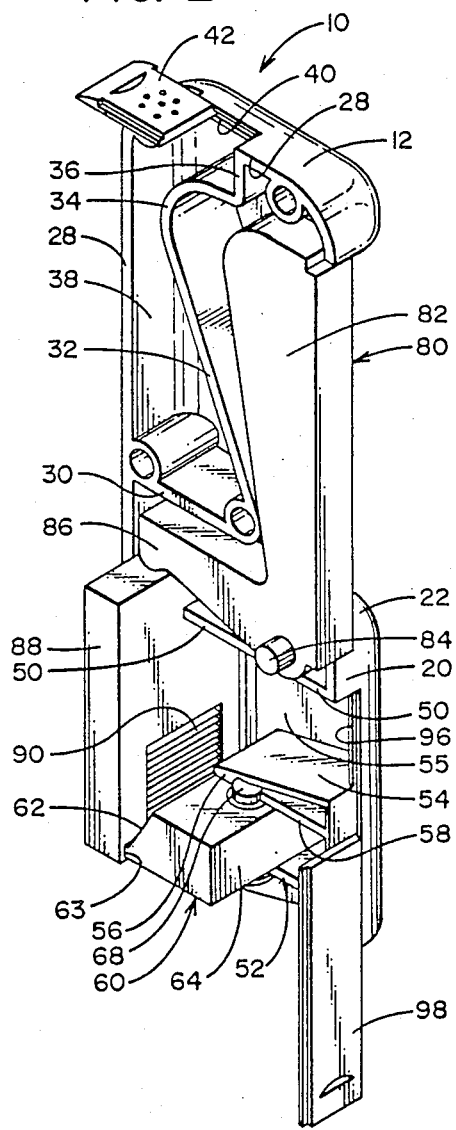
FIG. 2 is a cutaway view in perspective showing details of the internal mechanism and the condiment compartments and the general manner of function of the device.
Figure 9:
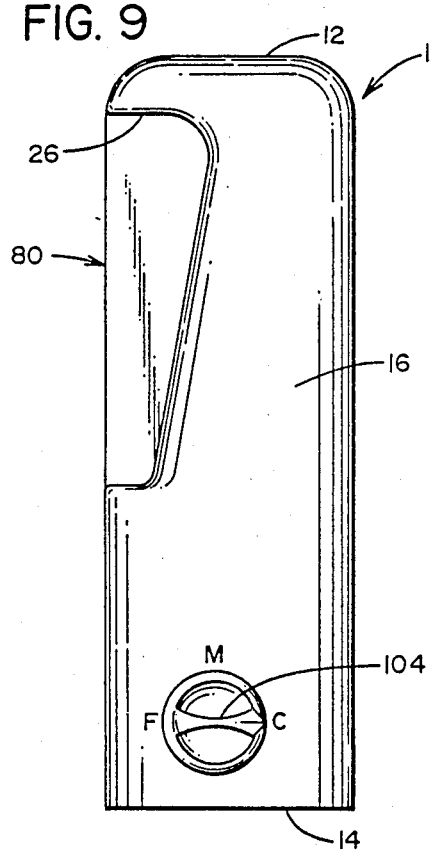
FIGS. 9 and 11 show that the grind adjustment feature may be located in the side wall rather than on the bottom.
Figure 11:
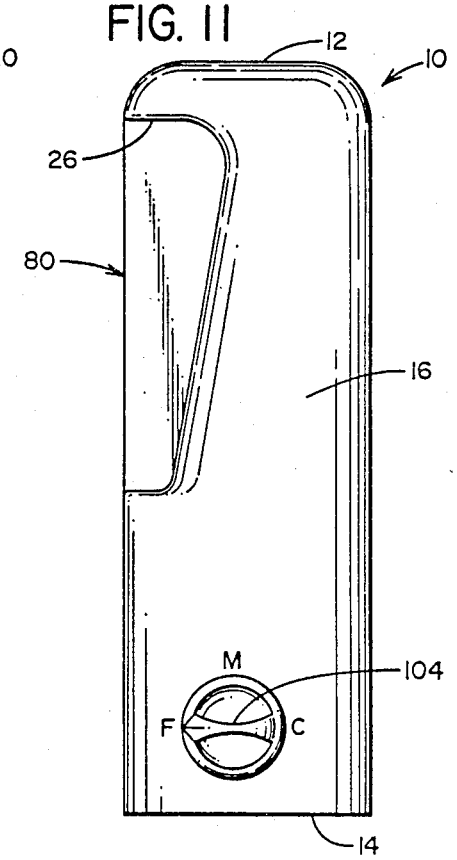
Figure 10:
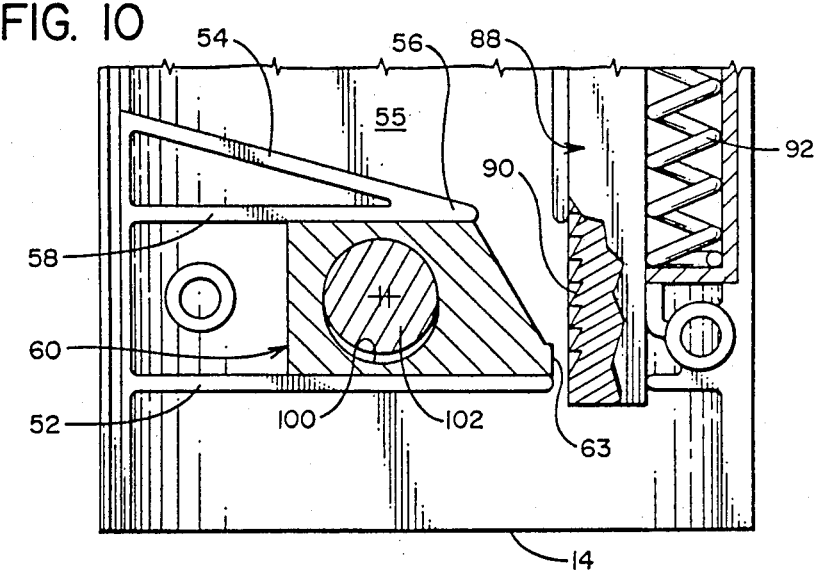
FIGS. 10 and 12 show that the nose of the grinding block is spaced with respect to grinding surface according to type of grind desired.
Figure 12:
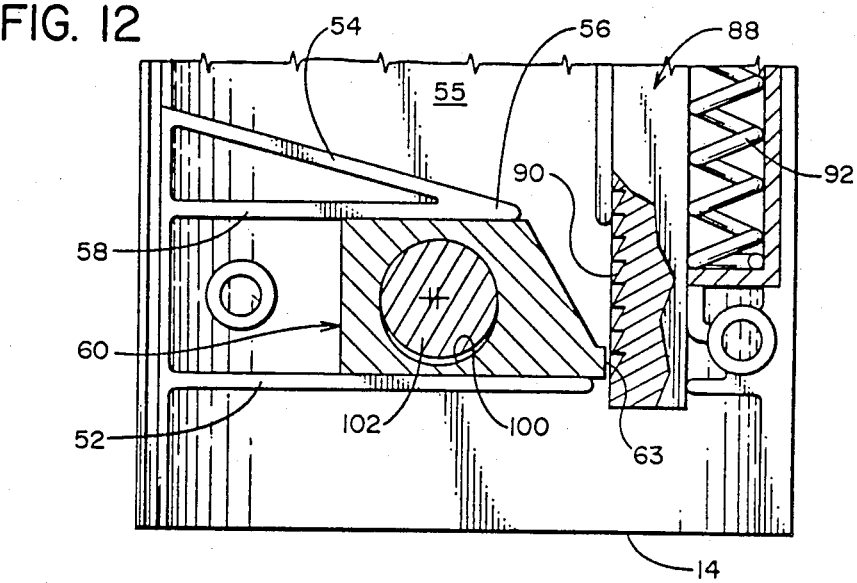

As will be seen by reference to the drawings, the invention generally designated by the number 10, has an upper end 12, a lower end 14, side surfaces 16, back surface 18 and a front surface 20. The front surface of the housing can be seen to include a lever recess area which begins approximately half-way up the front edge surface 20 and which extends inwardly generally horizontally a short distance and then angles upwardly and rearwardly. The recess is in close proximity to the top surface 12 and is roughly one-half the front to back dimension at its deepest. Recess surface 22 extends inwardly and merges with surface 24 which angles upwardly and rearwardly. The recess then extends outwardly again as surface 26 near the top surface 12 of the housing or body. It will be appreciated that the surfaces as generally described are not precisely defined by sharp corners or edges. In the interest of artistic and pleasing appearance and comfortable handling, the device is rounded at corners and along edges so that it presents an asthetically pleasing shape and configuration. The description of the recess-defining surfaces are included generally for convenience sake and to aid in description of the device.

As contemplated, the invention will be made from two matching halves which will join along a centerline 28 as can be seen in most of the views in the drawings.

The two halves of the housing in effect comprise mirror images of each other except of course for press fit pins and pin receptacles and for the adjustment knob for the grind adjustment on the side. FIGS. 1-4 will therefore be described. Besides the surfaces 22, 24 and 26 which define the lever and hand recess area in the upper portion of the body of the dispenser, each half of the plastic body includes internal wall structure of a predetermined thickness and predetermined location. While plastic has been specified, wood or light metal may also be used as the body material. The top surface 12 has its wall up to centerline 28 as described above. The two halves of the body include horizontal wall 30 which is located approximately midway down from the top of the body and which horizontal wall 30 also joins with upwardly and rearwardly extending compartment wall 32 which near the top reverse curves forwardly as wall 34 and which finally joins top surface 12 with upwardly extending wall 36. When the two halves are joined together, walls 30, 32, 34 and 36 as well as the outside walls of course are joined together to define condiment chamber 38. Chamber 38 at the top is seen to have rectangular or other shaped opening 40 with perforated slide plate 42 reciprocally movable therein so that compartment 38 can be replenished with condiment or seasoning such as salt when desired.

The lower portion of the housing, as can be seen from the figures, shows a top wall 50 extending horizontally in from the front edge 20 of the device to approximately two-thirds the way to the rear edge surface 18 of the housing. At the bottom of the housing and recessed upwardly from the lower edge 14 is a bottom wall 52 forming the lower exterior of the device. It will be noted that a ramp wall 54 extending from the front edge 20 downwardly and rearwardly toward the back surface of the device terminates at a point 56 at a distance of slightly halfway past the vertical centerline of the dispenser body. A horizontal dividing wall 58 extends from point 56 generally horizontally forwardly to the front surface 20 as is seen in the drawings. Thus, a vertical spacing is defined between walls 52 and wall 58 for purposes which are now to be described.

Between wall 52 and wall 56 can be seen to be adjustable grinding block 60 which has a tapered ramp surface 62 upper, and lower surfaces which are in close proximity to wall 58 and wall 52 respectively, and a rear surface 64 as well as shearing edge 63 which extends beyond the plane of the sloped surface 62. An eccentric shaft is aligned between two openings in the upper and lower walls 58 and 52 such that in one position as shown in FIG. 8 the grinding block 60 is moved rearwardly for a fine grind and may be moved toward the front edge 20 when a coarser grind is desired. A simple manipulation of the finger member 66 to turn shaft 68 which in turn moves cam 70 to move the block. Note that the shaft 68 is aligned in the openings in spaced apart walls 52 and 58. As it is turned, the cam moves the block toward or away from a slide member 88.

The mechanism includes the L-shaped lever member number 80 having generally vertical and longer arm 82 which pivots around axis 84 and which has an inwardly extending actuating arm 86. A nose portion on arm 86 engages a movable or slide member 88 having a gripping surface with coacting grinding teeth or serrations 90 whcih coast with the grinder block 60, the angled surface 62 and shearing edge 63 described above. A compression spring 92 is disposed behind the slide member 88 and which slide member has an outwardly or rearwardly extending arm 94 which confines compression spring 92 such that slide bar 88 is always biased upwardly against the pressure exerted by arm 86 of lever 80

An opening 96 is defined between the two halves in the front wall 20 so that slide cover 98 can be retracted away from the opening and a fresh supply of peppercorns or condiment inserted therein into compartment 55. The inwardly extending lever portion 86 is located between compartment wall 30 of the upper compartent and wall 50 of lowe compartment 55.

Referring now to FIGS. 9-12, it will be seen that condiment grinder 10 has the grind adjustment feature mounted on the side wall rather than on the bottom. It will be noted that a shaft connected to the indicator and finger member 104 is offset with respect to eccentric 102 which moves in opening 100 in block 60. Three setting for fine, coarse, and medium grinds are provided.

Figure 13:
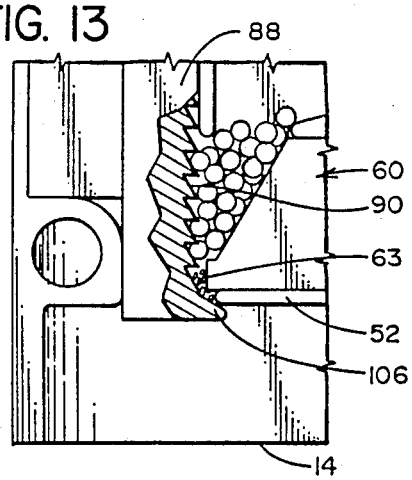
FIG. 13 shows one form of anti-dribble feature in the form of a rigid lip.

FIGS. 13 and 14A through 14D illustrate the several forms which a retainer or anti-dribble feature for fines may take. In FIG. 13, an elongated lip 106 formed along the bottom end of lever member 88 comprises a solid anti-dribble device to close off the ejection slot.

Figure 14A:
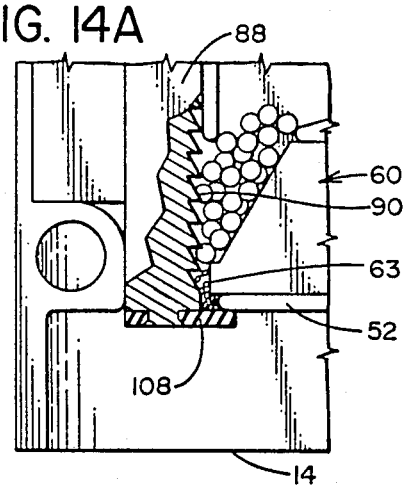
FIGS. 14A and 14B show a flexible anti-dribble device.
Figure 14B:
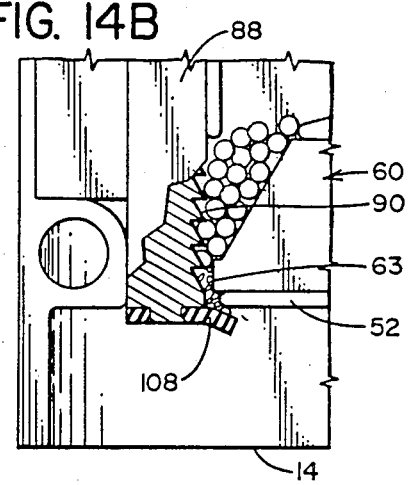

FIGS. 14A and 14B include flexible member 108 mounted in any desirable fashion on the bottom ends of member 88. The ejection slot again is closed off to prevent dribbling of fines when the grinder is not in use.

Figure 14C:
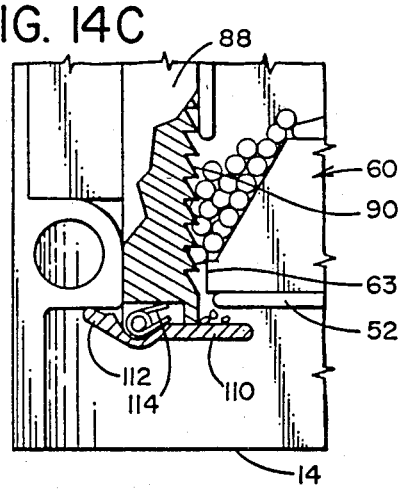
FIGS. 14C and 14D show a rotatable anti-dribble device.
Figure 14D:
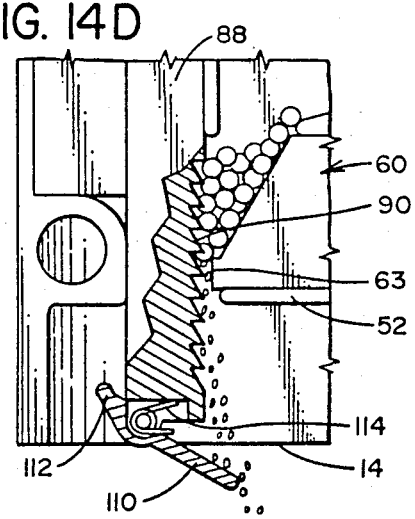

Finally, FIGS. 14C and 14D illustrate a rotatable member 110, 112 which may have spring 114 to bias part 110 outwardly. The part 112, being integral with 110, closes 110 with respect to the ejection slot when the slide 88 is up. The spring 114 biases the member 110, 112 open when the slide 88 is moved downwardly.

We claim:

1. An adjustable condiment grinding device for a hand-held condiment grinder, comprising:
    a first member having a condiment gripping surface, said gripping surface having a discharge end;
    a second member having a sloped surface converging toward said discharge end of said first member;
    a sharp-cornered edge at the termination of the sloped surface of the second member adjacent the discharge end of the first member and extending outwardly from said second member toward said first member beyond the plane of the sloped surface of the second member;
    means for reciprocating one of said members relative to the other member along a first path for grinding condiment between said gripping surface and said sharp-cornered edge; and
    means for adjusting the position of one of said members relative to the other member in a direction perpendicular to said first path.

2. The grinding device of claim 1, said sharp-cornered edge defined by a flat ledge protruding outwardly toward said condiment gripping surface.

3. The grinding device of claim 2, said grinder including a rectangular housing, said first and second members being generally rectangular and fitted within said housing.

4. The grinding device of claim 3, including an anti-leak surface extending from said first member between said members and across said first path beyond said second member in the direction perpendicular to said first path, said anti-leak surface engaging the second member to close the space between the first and second members to prevent the discharge of condiment past the discharge end of the first member.

5. The grinding device of claim 4, said anti-leak surface including a surface integral with the gripping surface of the first member.

6. The grinding device of claim 4, said anti-leak surface including a flexible surface joined to said first member.

7. The grinding device of claim 4, said anti-leak surface including a rigid surface resiliently mounted on said first member.

8. The grinding device of claim 1, said grinder including a guide track generally perpendicular to said first path, said means for adjusting the position of one said member relative to the other said member including an eccentric pivot pin in said track, said second member being slidably fitted in said track and having a circular opening to receive the pivot pin so that rotation of the pivot pin will move the second member toward or away from the first member to adjust the coarseness of grind.

9. The grinding device of claim 8, said pivot pin being aligned transversely across said track.

10. The grinding device of claim 8, said pivot pin being aligned vertically across said track parallel to said first path.

11. The grinding device of claim 4, said grinder including a guide track generally perpendicular to said first path, said means for adjusting the positions of one said member relative to the other said member including an eccentric pivot pin in said track, said second member being slidably fitted in said track and having a circular opening to receive the pivot pin so that rotation of the pivot pin will move the second member toward or away from the first member to adjust the coarseness of grind.

12. A hand-held condiment grinder having a housing with a discharge opening, a reciprocable condiment gripping element in said opening, means for reciprocating the condiment gripping element including means biasing the grippng element upwardly away from the discharge opening, a vertically restrained but horizontally movable shearing element having a sloped surface and a shearing edge protruding outwardly from the termination of said sloped surface toward said condiment gripping element but terminating a predetermined distance from the gripping element to define a grinding gap therebetween, and means for adjustably positioning the shearing element in said horizontal direction to adjust the width of said grinding gap.

13. The grinder of claim 12, said adjustable positioning means including a circular opening in said shearing element, a pivot pin in said housing extending through said circular opening, said pivot pin having an eccentric pivot axis, whereby rotation of said pivot pin causes horizontal movement of said shearing element for precise adjustment of said grinding gap.

14. The grinder of claim 12 wherein said condiment gripping element includes downwardly projecting, sawtooth-type teeth.

15. A hand-held adjustble condiment grinding device, comprising:
    hand-held housing;
    a first member mounted in the housing having a condiment gripping surface with upper and lower ends;
    a second member mounted in the housing having a sloped shearing surface converging toward the lower end of the gripping surface of the first member and ending adjacent the gripping surface of the first member, said second member having a sharp-cornered edge protruding outwardly from the second member adjacent the lower end of the gripping surface of the first member;
    means for reciprocating one of said members relative to the other member along a first path for cracking condiment between the gripping surface and the sharp-cornered edge of the shearing surface;
    a guide track in the housing positioned generally perpendicular to the first path;
    the second member being mounted slidably within the guide track and movable toward and away from the first member; and
    means for precisely adjusting the sliding movement of the second member within the track to finely adjust the gap between the sharp-cornered edge of the shearing surface and the gripping surface for adjusting the coarseness of the cracked condiment.

16. The hand-held adjustable condiment grinding device according to claim 15 wheein the means for adjusting the sliding movement of the second member within the guide track is an eccentric pivot pin, the second member having a circular opening to receive the pivot pin so that rotation of the pivot pin will move the second member toward or away from the first member.

17. The hand-held adjustable condiment grinding device according to claim 16 wherein the pivot pin is aligned horizontally from side to side across the guide track.

18. The hand-held adjustable condiment grinding device according to claim 16 wherein the pivot pin is aligned vertically across the guide track parallel to the first path.

* * * * *

UNITED STATES PATENT AND TRADEMARK OFFICE
CERTIFICATE OF CORRECTION

PATENT NO. : 4,697,749

DATED : October 6, 1987

INVENTOR(S) : David A. Holcomb; James A. Tryon

It is certified that error appears in the above—identified patent and that said Letters Patent is hereby corrected as shown below:

Column 6:

Claim 11, line 3, delete "positions" and substitute therefor --position--.

Claim 15, line 1, delete "adjustble" and substitute therefor --adjustable--.

Claim 15, line 3, add --a-- before the words "hand-held".

Claim 16, line 2, delete "wheein" and substitute therefor --wherein--.

Signed and Sealed this

Nineteenth Day of April, 1988

Attest:

DONALD J. QUIGG

Attesting Officer　　Commissioner of Patents and Trademarks